United States Patent
Hu et al.

(10) Patent No.: US 11,906,887 B2
(45) Date of Patent: Feb. 20, 2024

(54) PROJECTION SYSTEM FOR REDUCING LIGHT DIFFRACTION

(71) Applicant: APPOTRONICS CORPORATION LIMITED, Shenzhen (CN)

(72) Inventors: Fei Hu, Guangdong (CN); Zuqiang Guo, Guangdong (CN); Peng Du, Guangdong (CN); Yi Li, Guangdong (CN)

(73) Assignee: APPOTRONICS CORPORATION LIMITED, Shenzhen (CN)

(*) Notice: Subject to any disclaimer, the term of this patent is extended or adjusted under 35 U.S.C. 154(b) by 964 days.

(21) Appl. No.: 16/642,763

(22) PCT Filed: Dec. 6, 2017

(86) PCT No.: PCT/CN2017/114739
§ 371 (c)(1),
(2) Date: Dec. 3, 2020

(87) PCT Pub. No.: WO2019/041622
PCT Pub. Date: Mar. 7, 2019

(65) Prior Publication Data
US 2021/0084266 A1    Mar. 18, 2021

(30) Foreign Application Priority Data
Aug. 30, 2017   (CN) .......................... 201730406193.5

(51) Int. Cl.
*G03B 21/00*   (2006.01)
*G03B 21/14*   (2006.01)
(Continued)

(52) U.S. Cl.
CPC ......... *G03B 21/008* (2013.01); *G03B 21/142* (2013.01); *G03B 21/204* (2013.01);
(Continued)

(58) Field of Classification Search
CPC .. H04N 9/3126; H04N 9/3114; H04N 9/3152; H04N 9/3155; H04N 19/00;
(Continued)

(56) References Cited

U.S. PATENT DOCUMENTS

| | | | | |
|---|---|---|---|---|
| 2006/0092389 A1* | 5/2006 | Wang | ................. | G02B 27/0994 353/99 |
| 2008/0211995 A1* | 9/2008 | Jeon | ..................... | H04N 5/7458 348/E5.142 |

(Continued)

FOREIGN PATENT DOCUMENTS

| | | |
|---|---|---|
| CN | 1954257 A | 4/2007 |
| CN | 102193301 A | 9/2011 |

(Continued)

OTHER PUBLICATIONS

International Search Report for International Application No. PCT/CN2017/114739, dated May 29, 2018.

*Primary Examiner* — Magda Cruz
(74) *Attorney, Agent, or Firm* — MARSHALL, GERSTEIN & BORUN LLP; Michael P. Furmanek

(57) ABSTRACT

A projection system, comprising a light modulation device, a light source system and a light offset device. The light source system is used for emitting one or more illumination sub-beams. The light modulation device is used for modulating illumination light according to image data to form image light, the image light being used for displaying an image corresponding to the image data. The light offset device is used for transferring one illumination sub-beam to each zone of a micro-mirror unit by means of a time sequence such that the micro-mirror unit modulates the illumination sub-beam by means of a time sequence to form image light of a pixel corresponding to each zone, wherein each zone corresponds to one pixel of an image.

16 Claims, 6 Drawing Sheets

(51) Int. Cl.
*G03B 21/20* (2006.01)
*H04N 9/31* (2006.01)
*H04N 19/00* (2014.01)

(52) U.S. Cl.
CPC ......... *G03B 21/208* (2013.01); *H04N 9/3114* (2013.01); *H04N 9/3126* (2013.01); *H04N 9/3152* (2013.01); *H04N 9/3155* (2013.01); *H04N 19/00* (2013.01)

(58) Field of Classification Search
CPC .... H04N 9/317; H04N 9/3188; G03B 21/008; G03B 21/142; G03B 21/204; G03B 21/208; G03B 33/08
See application file for complete search history.

(56) References Cited

U.S. PATENT DOCUMENTS

| | | | | |
|---|---|---|---|---|
| 2010/0283977 A1* | 11/2010 | Wang et al. | ......... | G03B 21/206 |
| | | | | 250/504 R |
| 2012/0327376 A1 | 12/2012 | Mehrl | | |
| 2018/0033357 A1* | 2/2018 | Li | .................... | G09G 3/007 |

FOREIGN PATENT DOCUMENTS

| | | | |
|---|---|---|---|
| CN | 105980926 A | 9/2016 | |
| CN | 106444240 A | 2/2017 | |
| JP | 2002139792 A | 5/2002 | |
| WO | WO-2008041363 A1 * | 4/2008 | ........... G02B 26/008 |

* cited by examiner

PROJECTION SYSTEM FOR REDUCING LIGHT DIFFRACTION

TECHNICAL FIELD

The present disclosure relates to the field of projection display, and particularly, to a projection system.

BACKGROUND

Currently, projection display can be applied to various aspects of life, and a core component thereof usually is a light modulation device. The commonly used light modulation devices are related to the light modulation technology that they used. For example, the Digital Light Processing (DLP) technology mainly uses Digital Micromirror Device (DMD) chip as its light modulation device, and other light modulation technologies, such as Liquid Crystal on Silicon (LCoS) technology and Liquid Crystal Display (LCD) technology, use the corresponding light modulation devices, respectively.

With the demand for high-quality and high-resolution display, it is a development trend that the light modulator comprises more and smaller pixel units. As for the DMD chip, a size of each micromirror unit can reduced from 13.7 um to 10.8 um, to 7.6 um, and to 5.4 um currently, or even to 3.8 um in the future, in order to improve the resolution and reduce a size of the entire chip.

However, when the micromirror unit becomes smaller, it may cause some optical problems, such as the light diffraction.

SUMMARY

In view of the above, it is necessary to provide a projection system, which can reduce the light diffraction.

A projection system, comprising:
a light modulation device configured to modulate incident light based on image data to form image light for displaying an image corresponding to the image data, wherein the light modulation device comprises a plurality of micromirror units, each of the plurality of micromirror units comprises an irradiation region including a plurality of sections, each of the plurality of sections corresponds to one pixel in the image, and incident light irradiating one section of the plurality of sections is modulated to form image light of a pixel corresponding to the one section;
a light source system configured to emit one or more illumination sub-beams, wherein the one or more illumination sub-beams irradiates one of the plurality of sections; and
a light deflecting device configured to shift the one or more illumination sub-beams from one section of the plurality of sections to another section of the plurality of sections of one of the plurality of micromirror units in such a manner that each of the plurality of sections of each of the plurality of micromirror units modulates the one or more illumination sub-beams in a time division manner to form image light of a pixel corresponding to each of the plurality of sections.

In an embodiment, a coverage area of each of the one or more illumination sub-beams on the micromirror unit is not larger than an area of the one of the plurality of sections.

In an embodiment, pixels corresponding to sections of each of the plurality of micromirror units are adjacent in the image.

In an embodiment, the one or more illumination sub-beams emitted from the light source system are corresponding to the plurality of micromirror units of the light modulation device in one-to-one correspondence, and the light deflecting device is configured to cyclically deflect one of the one or more illumination sub-beams emitted by the light source system in the plurality of sections of the micromirror unit which is corresponding to the illumination sub-beam.

In an embodiment, the light deflecting device has a plurality of position states corresponding to the plurality of sections of the micromirror unit in one-to-one correspondence, and the light deflecting device is configured to, when the light deflecting device is in one of the plurality of position states, direct one of the one or more illumination sub-beam to one section corresponding to the position state; and the light deflecting device is configured to traverse each of the plurality of position states in such an order that a deflection magnitude from one position state to a next position state of the plurality of position states is as small as possible.

In an embodiment, each of the plurality of micromirror units comprises four sections defined by two intersecting lines, and one of the one or more illumination sub-beams is shifted to each of the four sections of the micromirror unit in a clockwise or counterclockwise direction.

In an embodiment, the light deflecting device is a square flat plate, and the one or more illumination sub-beams transmit through the light deflecting device to irradiate each of the plurality of micromirror units; the light deflecting device has four position states corresponding to the four sections of the one micromirror unit in one-to-one correspondence, and the light deflecting device is configured to deflect from an initial position state of the four position states along a first deflection axis, a second deflection axis, and a third deflection axis to a second position state, a third position state, and a fourth position state of the four position states, respectively, to shift the one illumination sub-beam to the four sections of the one micromirror unit; and the light deflecting device comprises a first side, a second side, a third side, and a fourth side that are connected end-to-end to form the square flat plate; and the first deflection axis is parallel to the first side or the third side; the second deflection axis is parallel to the second side or the fourth side; the first side and the second side intersect at a first intersection side, the third side and the fourth side intersect at a second intersection side, and the third deflection axis is parallel to a line connecting the first intersection side to the second intersection side.

In an embodiment, a modulation frequency of the light modulation device is a multiple of a refresh frequency of the image, and the multiple is equal to a number of the plurality of sections of each of the plurality of micromirror units.

In an embodiment, the light source system further comprises an illumination source configured to emit an illumination beam, and a microlens array configured to split the illumination beam emitted by the illumination source into the one or more illumination sub-beams corresponding to the plurality of micromirror units of the light modulation device in one-to-one correspondence.

In an embodiment, the light source system further comprises a light homogenizing device disposed on an optical path between the illumination source and the microlens array, and configured to homogenize the illumination beam.

In an embodiment, the light source system further comprises a color wheel disposed in the optical path between the illumination source and the microlens array. The color wheel is configured to convert the illumination beam emitted by the illumination source to obtain a monochromatic illumination beam or a color mixing illumination beam for modulating the image light, and is further configured to output the converted illumination beam to the microlens array.

In an embodiment, each of the plurality of sections of one of the plurality of micromirror units modulates image light of a pixel corresponding to the section in different modulation periods, and one section of the plurality of sections of each of the plurality of micromirror units of the light modulation device is configured to modulate image light in one same modulation period. From one modulation period to a next modulation period, the light deflecting device is configured to deflect one of the one or more illumination sub-beams from one section to a next section of the plurality of sections of one of the plurality of micromirror units. The projection system further comprises a processing device, the processing device is configured to extract, from the image data, data of a pixel corresponding to a section of the light modulation device that modulates image light in a same modulation period, as image data corresponding to one modulation period, so as to obtain image data corresponding to each modulation period required for modulating the image by the light modulation device, and the processing device is further configured to provide the light modulation device with corresponding image data in each modulation period when the light modulation device is modulating the image, such that each of the plurality of micromirror units of the light modulation device modulates the image light in different modulation periods based on the corresponding image data, wherein image data obtained by the light modulation device in one modulation period comprises image data of a pixel corresponding to an irradiated section of the light modulation device in the one modulation period.

In an embodiment, the processing device is further configured to decode a video source to generate the image data, and is further configured to unpack the image data based on a number of the plurality of sections of one of the plurality of micromirror units, to extract, from the image data, the data of the pixel corresponding to the section of the light modulation device that modulates the image light in the same modulation period.

In an embodiment, a number of the image data that are obtained after decoding the video source by the processing device, corresponds to a number of the modulation periods.

In an embodiment, the processing device is configured to generate a corresponding synchronization signal based on corresponding image data provided to the light modulation device in each modulation period; the projection system further comprises a control device configured to receive the synchronization signal, and control the light deflecting device to be in a corresponding position state based on the synchronization signal, such that one of the one or more illumination sub-beams is cyclically deflected in the plurality of sections of a corresponding one of the plurality of micromirror units.

In an embodiment, when the control device controls the light deflecting device to be in the corresponding position state based on the synchronization signal, the light modulation device is configured to modulate image data of a pixel corresponding to a section of the plurality of sections that is irradiated in the corresponding position state of the light deflecting device. The above projection can control the illumination sub-beam to be shifted to each section of one micromirror unit through the light deflecting device, each section of the micromirror unit may correspond to one pixel of the image, and thus one micromirror unit can modulate the image light of a plurality of pixels. In this way, a high-resolution projection screen can be obtained, and the problem of light diffraction, which is caused by the small size of the micromirror unit, can be reduced or even avoided.

REFERENCE SIGNS OF MAIN ELEMENTS

| | |
|---|---|
| illumination source | 601 |
| color wheel | 602 |
| collecting lens | 603 |
| light homogenizing device | 604 |
| microlens array | 605 |
| light relay device | 606 |
| light deflecting device | 607 |
| light modulation device | 608 |
| collimating lens | 609 |
| prism | 610 |
| microlens unit group | 6050 |
| micromirror unit | 6080 |
| first microlens unit | 6051 |
| second microlens unit | 6053 |
| control device | 630 |
| processing device | 632 |
| light source system | 10 |

The present disclosure is further described in the following embodiments with reference to the drawings mentioned above.

DESCRIPTION OF EMBODIMENTS

In order to clarify the above-mentioned objects, features, and advantages of the present disclosure, the present disclosure is described in detail below with reference to the accompanying drawings and specific embodiments. It should be understood that embodiments of the present disclosure can be combined with each other and the features in the embodiments can be combined with each other when there is no conflict therebetween.

In the following description, many specific details are set forth to help fully understanding of the present disclosure. The described embodiments are only parts of, rather than all the embodiments of the present disclosure. Based on the embodiments of the present disclosure, other embodiments obtained by those skilled in the art without creative efforts shall fall within the protection scope of the present disclosure.

Unless defined otherwise, all technical and scientific terms used herein have the same meanings known by those skilled in the technical field of the present disclosure. The terms used herein are merely for the purpose of describing specific embodiments, but not intended to limit the present disclosure.

Embodiment 1

Figure 1:
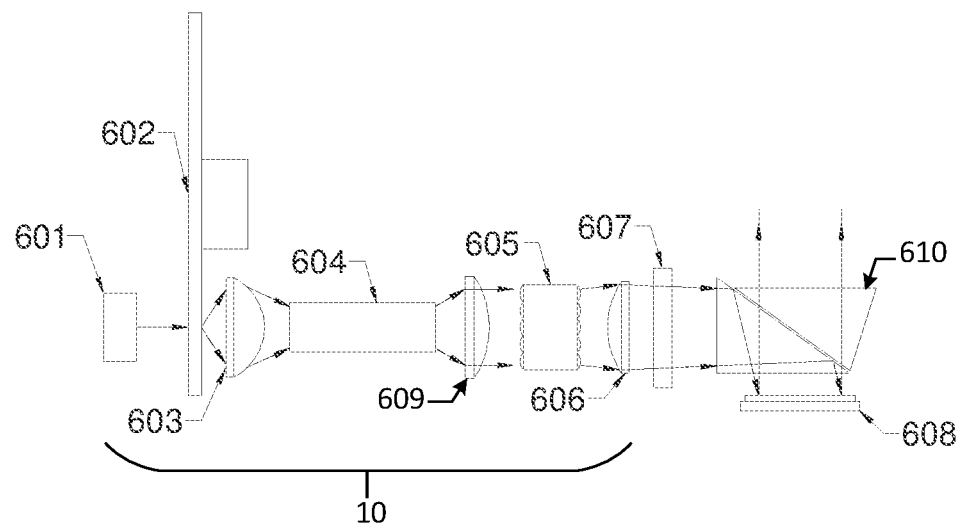
FIG. 1 is a schematic diagram of a projection system according to a first embodiment of the present disclosure.

Referring to FIG. 1, a first preferred embodiment of a projection system of the present disclosure can include a light source system 10, a light deflecting device 607, a light modulation device 608, and a prism 610. The light source system 10 is configured to emit one or more illumination sub-beams. The light deflecting device 607 is configured to deflect the one or more illumination sub-beams. The light modulation device 608 is configured to modulate the one or more illumination sub-beams according to image data, so as to generate image light corresponding to the image data, and the image light can be projected as a projection screen corresponding the display image data through the prism 610. In the present embodiment, it is preferable that the light source system 10 includes an illumination source 601, a color wheel 602, a collecting lens 603, a light homogenizing device 604, a microlens array 605, a light relay device 606, and a collimating lens 609.

In the present embodiment, the illumination source 601 is configured to emit an illumination beam. The color wheel 602 is disposed in an optical path between the illumination source 601 and the microlens array 605, and the color wheel 602 is configured to convert the illumination beam emitted by the illumination source 601 to obtain a monochromatic illumination beam or a color mixing illumination beam for modulating the image light, and is also configured to output the converted illumination beam to the microlens array. In an embodiment, the illumination beam emits white light, and the color wheel 602 is a filter wheel and is configured to filter the illumination beam emitted by the illumination source 601 in a time division manner to filter out monochromatic light or color mixing light such as red light, green and/or blue light for modulating the image light. In another embodiment, the color wheel 602 comprises a plurality of sections, and at least one section is provided with a wavelength conversion material. The wavelength conversion material is excited by the illumination beam and generate an excited light having a wavelength different from that of the illumination beam. Preferably, the plurality of sections can further include one or more transparent sections. The one or more transparent sections are configured to transmit the illumination beam, and the excited light and the illumination beam transmitted from the transparent section are used to modulate the image light. The collecting lens 603 is configured to collect the illumination beam emitted from the color wheel 602 and couple the illumination beam to the light homogenizing device 604. The light homogenizing device 604 is configured to perform a homogenization on the illumination beam. The collimating lens 609 is configured to perform a collimation on the homogenized illumination beam, and transmit the collimated illumination beam to the microlens array 605. The microlens array 605 is disposed on a transmission optical path of the illumination beam output by the collimating lens 609, and is configured to perform a beam splitting processing on the illumination beam, so as to obtain one or more illumination sub-beams. After the one or more of the illumination sub-beams are subjected to a relay processing performed by the light relay device 606 and is deflected by the light deflecting device 607, the illumination sub-beams are guided to corresponding sections of the micromirror unit 6080 arranged in the light modulation device 608 (see FIG. 3). The light modulation device 608 is configured to modulate one or more illumination sub-beams in a time division manner according to the image data, so as to generate the image light corresponding to the image data. The light modulation device 608 can also be configured to reflect the modulated image light to the prism 610, and the image light is projected as a corresponding image through the prism 610.

Figure 2:
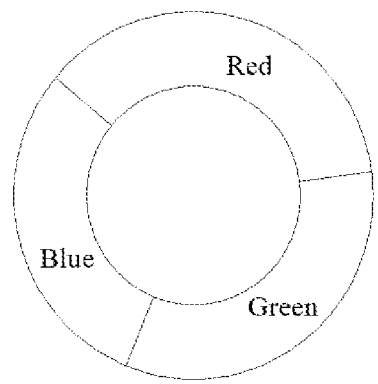
FIG. 2 is a schematic diagram of a color wheel shown in FIG. 1 according to an embodiment of the present disclosure.

FIG. 2 is a schematic diagram of the color wheel 602 according to a preferred embodiment. In the present embodiment, the color wheel 602 can be a transmissive fluorescent wheel. In other embodiments, the color wheel 602 can be a reflective fluorescent wheel or other types of color wheel.

The color wheel 602 includes a red-light color segment R, a green-light color segment G, and a blue-light color segment B that are arranged along a circumferential direction thereof. The red-light color segment R is provided with a wavelength conversion material for generating red fluorescence, or a wavelength conversion material for generating a yellow fluorescence; the green-light color segment G is provided with a wavelength conversion material for generating a green fluorescence; and the blue-light color segment B is configured to transmit a blue light. In other embodiments, the blue-light color segment B can be configured to reflect a blue light, and the design of an optical path of the entire system is adapted to such a change. In the present embodiment, the illumination beam generated by the illumination source 601 is a blue exciting light. When the illumination beam generated by the illumination source 601 irradiates the red-light color segment R and the green-light color segment G, the red-light color segment R is excited to generate red fluorescence or yellow fluorescence. The yellow fluorescence can be further filtered to obtain red light. When the illumination beam generated by the illumination source 601 irradiates the blue-light color segment B, the illumination beam is transmitted by the blue-light color segment B. The color wheel 602 can be driven by a driving device (not shown) to rotate periodically. In this way, the red-light color segment R, the green-light color segment G, and the blue-light color segment B can be alternatively and periodically located on the transmission optical path of the illumination beam generated by the illumination source 601, such that the color wheel 602 can periodically output light sequences of three primary colors of red, green, and blue.

In the present embodiment, the color wheel 602 can have a wheel-like structure and can be driven to rotate by a driving device. In other embodiments, the color wheel 602 can have a belt-like structure, which is configured to periodically move under the driving of a driving device; or have a cylindrical structure, which is configured to periodically rotate under the driving of a driving device.

The collecting lens 603 is configured to collect light emitted from the color wheel 602 and couple the illumination beam to an entrance end surface of the light homogenizing device 604.

The light homogenizing device 604 is configured to perform a homogenization on the illumination beam, so as to form a uniform illumination beam on an exit end surface thereof. In the present embodiment, the illumination beam enters the entrance end surface of the light homogenizing device 604, and exits from the exit end surface of the light homogenizing device 604 after being reflected multiple times inside the light homogenizing device 604, and forms a uniform illumination beam on the exit end surface of the light homogenizing device 604, for the purpose of homogenization. In an embodiment, the light homogenizing device 604 can be a square rod, and the square rod can be made of solid glass or optical plastic. In other embodiments, the square rod can also be a hollow device spliced by reflecting mirrors coated with high-reflecting films.

Figure 3:
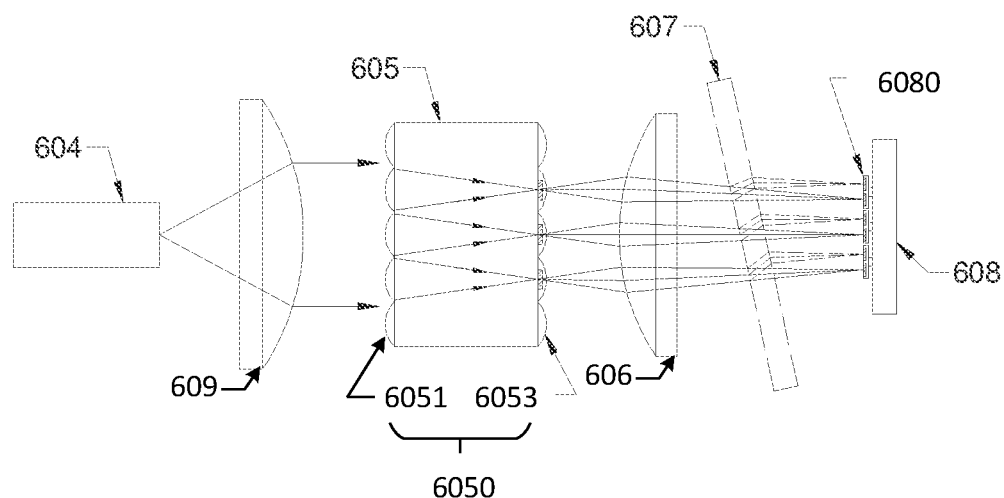
FIG. 3 is a schematic diagram of a beam splitting processing of an outgoing beam shown in FIG. 1 according to an embodiment of the present disclosure.

Referring to FIG. 3, the collimating lens 609 is configured to collimate the illumination beams such that the collimated illumination beams enter the microlens array 605 at a small angle or in parallel.

The microlens array 605 includes an incident surface and an exit surface, and a plurality of microlens unit groups 6050 are provided on the incident surface and the exit surface. Each microlens unit group 6050 includes a first microlens unit 6051 disposed on the incident surface of the microlens array 605 and a second microlens unit 6053 correspondingly disposed on the exit surface of the microlens array 605. A focus of each first microlens unit 6051 coincides with a center of a corresponding second microlens unit 6053. It can be understood that the second microlens unit 6053 of each microlens unit group 6050 is located on a focal plane of a corresponding first microlens unit 6051. Thus, when the illumination beam is incident on the first microlens unit 6051 disposed on the incident surface, the outgoing beams are focused at the center of the second microlens unit 6053 after passing through the first microlens unit 6051 and being focused by the first microlens unit 6051, so as to form one or more illumination sub-beams. In the present embodiment, the second microlens unit 6053 disposed on the exit surface of the microlens array 605 corresponds to the micromirror unit 6080 of the light modulation device 608 in one-to-one correspondence, such that each illumination sub-beam can be transmitted through the light deflecting device 607 to irradiate the corresponding micromirror unit 6080. In the present embodiment, the second microlens units 6053 on the exit surface of the microlens array 605 can be arranged in a matrix. One illumination sub-beam irradiates a section of the micromirror unit 6080, i.e., most of a light spot of one illumination sub-beam irradiates a section of the micromirror unit 6080.

The light relay device 606 performs relay processing on the illumination sub-beams. In the present embodiment, there is a certain distance between the microlens array 605 and the light modulation device 608, and thus the light relay device 606 can be disposed between the microlens array 605 and the light modulation device 608, in order to reduce light energy loss of the illumination sub-beams when being transmitted to the light modulation device 608 along the optical path. Therefore, the light energy loss of the illumination sub-beams during transmission can be reduced.

In the present embodiment, the light relay device 606 can also perform focus processing on each illumination sub-beam. It can be understood that, since each second microlens unit 6053 is located at the focal plane of a corresponding first microlens unit 6051, each illumination sub-beam is focused by the first microlens unit 6051 and has a certain divergence angle after exiting from the second microlens unit 6053. In this way, if the divergence angle of the illumination sub-beam is relatively large, the illumination sub-beam may irradiate at least two sections of the corresponding micromirror unit 6080 when it irradiates the corresponding micromirror unit 6080, thereby potentially reducing an accuracy of the modulation of the light modulation device 608. Therefore, in order to improve the accuracy of the illumination sub-beam received by the micromirror unit 6080 of the light modulation device 608 and to avoid or reduce the possibility that the illumination sub-beam irradiates at least two sections of the micromirror unit 6080, the light relay device 606 can be configured to refocus the divergent illumination sub-beam. In this way, after being subjected to the relay processing, the relay sub-beam has an appropriate divergence angle, which can guide the illumination sub-beam accurately to one section of the micromirror unit 6080 of the light modulation device 608. In an embodiment, a coverage area of one illumination sub-beam on the micromirror unit 6080 is not larger than an area of one section of the micromirror unit. Those skilled in the art can understand that the protection scope of the present disclosure does not exclude the case where the coverage area of one illumination sub-beam on the micromirror unit is slightly larger than the area of one section of the micromirror unit. The incident light irradiating one section of the micromirror unit 6080 can be modulated to form the image light of corresponding pixels of the section.

In other embodiments, if the illumination sub-beam has an appropriate divergence angle when exiting from the microlens array 605, the light relay device 606 can be omitted. In this way, the light deflecting device 607 can be directly disposed on the optical path between the microlens array 605 and the light modulation device 608.

The light deflecting device 607 is configured to deflect the illumination sub-beam (incident light), such that the one or more illumination sub-beams irradiate one section of the corresponding micromirror unit 6080.

Figure 4:
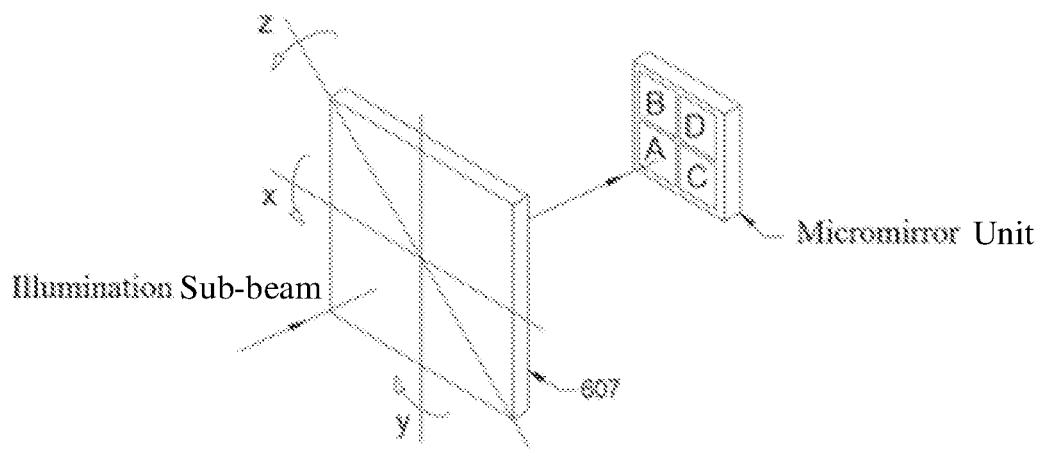
FIG. 4 is a schematic diagram of a deflection process of an illumination sub-beam shown in FIG. 1 according to an embodiment of the present disclosure.

Referring to FIG. 4, the light modulation device 608 includes a plurality of micromirror units 6080. In the present embodiment, each micromirror unit 6080 is provided correspondingly to the microlens unit group 6050 arranged on the microlens array 605 to receive the illumination sub-beam obtained after the beam splitting of the corresponding microlens unit group 6050. Preferably, each micromirror unit 6080 can be provided corresponding to the second microlens unit 6053 of the microlens unit group 6050 in one-to-one correspondence, so that each micromirror unit 6080 can receive one illumination sub-beam. In the present embodiment, the plurality of micromirror units 6080 can be arranged in a matrix to correspond to the plurality of microlens unit groups 6050 arranged on the microlens array 605. The light modulation device 608 can be a digital micromirror device (DMD) chip. The micromirror unit 6080 is provided in the DMD chip.

In the present embodiment, each micromirror unit 6080 includes an irradiation region which has a plurality of sections. In the present embodiment, the irradiation region of one micromirror unit includes four sections that are defined by two intersecting dividing lines, and the illumination sub-beam is sequentially shifted to the four sections of the one micromirror unit in a clockwise or counterclockwise direction. The four sections can be section A, section B, section C and section D, respectively. It can be understood that, the section A can be located at lower left of the four sections, the section B can be located at upper left of the four sections, the section D can be located at upper right of the four sections, and the section C can be located at lower right of the four sections. That the illumination sub-beam is sequentially shifted to the four sections of one micromirror unit in the clockwise direction can be that the illumination sub-beam is shifted from section A, to section B, then to section D, and then to section C. That the illumination sub-beam is sequentially shifted to the four sections of the micromirror unit in the counterclockwise direction can be that the illumination sub-beam is shifted from section A, to section C, then to section D, and then to section B.

In an embodiment, the light deflecting device 607 can have four position states corresponding to the four sections of the micromirror unit in a one-to-one correspondence. For example, the light deflecting device 607 can have an initial state (a first position state), a second position state, a third position state, and a fourth position state.

Preferably, under the control of a control device 630 (shown in FIG. 5), the light deflecting device 607 can perform a deflection processing, such as deflections with respect to different deflection axes in a space, so as to allow the light deflecting device 607 having the four position states. In the present embodiment, the light deflecting device 607 can be a square flat plate, and under the control of the control device 630, the light deflecting device 607 can be deflected with respect to a plurality of deflection axes located in a plane of the light deflecting device 607.

In an embodiment, the light deflecting device 607 can perform a deflection processing around a first deflection axis, a second deflection axis, and a third deflection axis. The first deflection axis and the second deflection axis are perpendicular to each other, the third deflection axis is located between the first deflection axis and the second deflection axis, and the light deflecting device 607 can tilt sequentially with respect to the first deflection axis, the second deflection axis, and the third deflection axis, so as to achieve the purpose of deflection. It can be understood that the light deflecting device 607 can include a first side, a second side, a third side, and a fourth side (not shown). The first side, the second side, the third side, and the fourth side are connected end-to-end to form the square flat plate. Preferably, the first deflection axis (x) is parallel to the first side or the third side; the second deflection axis is parallel to the second side or the fourth side (y); the first side and second side intersect at a first intersection side, the third side and the fourth side intersect at a second intersection side, and the third deflection axis (z) is parallel to a line connecting the first intersection side to the second intersection side (i.e., a diagonal line of the square flat plate).

In another embodiment, a number of deflection axes, around which the light deflecting device 607 is deflected, is not limited to three. For example, it can be two or other number. In other embodiments, a number of sections included by each micromirror unit can be larger or smaller than a number of position states of the light deflecting device 607, and the number of sections included by each micromirror unit can not necessarily be equal to the number of position states of the light deflecting device 607.

It can be understood that, when the light deflecting device 607 performs the deflection, the illumination sub-beam has an incident angle with respect to an incident optical axis of the light deflecting device 607, and the illumination sub-beam can be refracted in the light deflecting device 607 when it is transmitted through the light deflecting device 607, such that the illumination sub-beam deviates from the exit optical axis and the incident optical axis of the light deflecting device 607, such as an offset smaller than one pixel. Therefore, when the light deflecting device 607 is deflected, an imaging position of the illumination sub-beam on the corresponding micromirror unit 6080 may change.

For example, the micromirror unit 6080 irradiated by the illumination spot may change from the first section of the micromirror unit 6080 to the second section of the micromirror unit 6080 adjacent to the first section.

In an embodiment, each section of the micromirror unit 6080 can correspond to one pixel in the image. It can be understood that, the image can contain 1080*1920 pixels (shown in FIG. 6), and each pixel can be represented as A (i, j), where i is a number in an interval [0, 1080), j is a number in an interval [0, 1920). One section of the micromirror unit 6080 can correspond to one pixel in the image, for example, the first section can correspond to a pixel A (17, 7). Different sections correspond to different pixels, for example, the second section can correspond to pixel A (7, 4). The pixels corresponding to the sections of one micromirror unit 6080 are adjacent pixels in the image. For example, the section A, the section B, the section D, and the section C in one micromirror unit 6080 can correspond to a pixel A (1, 0), a pixel A (0, 0), a pixel A (0, 1), and a pixel A (1, 1) in the image, respectively, and the pixel A (1, 0), the pixel A (0, 0), the pixel A (0, 1), and the pixel A (1, 1) are adjacent pixels.

When the light deflecting device 607 is deflected, the light deflecting device 607 can shift the illumination sub-beam to each section of a corresponding micromirror unit in a time division manner, such that the illumination sub-beam can irradiate each section of the corresponding micromirror unit 6080 cyclically. In this way, the illumination sub-beam can be cyclically deflected to each section of the corresponding micromirror unit. Since each section can be one pixel and each micromirror unit 6080 has a plurality of sections, one illumination sub-beam can cyclically irradiate each section of one micromirror unit 6080 to illuminate the micromirror unit 6080 for multiple times, i.e., to display a plurality of pixels in the corresponding image in one micromirror unit 6080. Therefore, a high-resolution projection screen can be realized by a light modulation device 608 with a relatively low resolution.

It can be understood that, when the light deflecting device 607 is not deflected (i.e., in the initial position state or the first position state), the illumination sub-beam can irradiate the section A of the corresponding micromirror unit 6080. When the light deflecting device 607 is deflected along the x deflection axis (in the second position state), the illumination sub-beam can irradiate the section B of the corresponding micromirror unit 6080. When the light deflecting device 607 is deflected along the z deflection axis (in the third position state), the illumination sub-beam can irradiate the section D of the corresponding micromirror unit 6080. When the light deflecting device 607 is deflected along the y deflection axis (in the fourth position state), the illumination sub-beam can irradiate the section C of the corresponding micromirror unit 6080.

Therefore, when the light deflecting device 607 is deflected around different deflection axes, the illumination sub-beam can cyclically irradiate each section of the corresponding micromirror unit 6080. In this way, the illumination sub-beam can be cyclically deflected to each section of the corresponding micromirror unit and illuminate the micromirror unit 6080 on the light modulation device 608 for multiple times, and one section of each micromirror unit 6080 can be a pixel, thereby obtaining a high-resolution projection screen.

It can be understood that, the light deflecting device 607 can cyclically deflect around the plurality of deflection axes, such that the illumination sub-beam is cyclically deflected in each corresponding section of the micromirror unit 6080. In the present embodiment, the light deflecting device 607 can traverse each of the position states in such an order that a deflection magnitude from one position state to the next position state is as small as possible. For example, the control device 630 can control the light deflecting device 607 to be in position states corresponding to 0 deflection→x axis deflection→z axis deflection→y axis deflection→0 deflection, cyclically. In this case, the order of the sections of the micromirror unit 6080 is the section A→the section B→the section D→the section C→the section A. Thus, if the illumination sub-beam is deflected in a clockwise direction, the sections of the micromirror unit 6080 are irradiated by the illumination sub-beam in an order of the section A>the section B>the section D>the section C. In other embodiments, with the deflection of the light deflecting device 607, the illumination sub-beam can also be deflected to the corresponding sections of the micromirror unit 6080 in the counterclockwise direction. For example, the sections are irradiated by the illumination sub-beam in an order of the section A>the section C>the section D>the section B>the section A, deflected in the counterclockwise direction. In the present embodiment, by controlling the deflection of the light deflecting device 607, the illumination sub-beam can irradiate the sections of the micromirror unit 6080 in the counterclockwise or clockwise direction, and the light deflecting device 607 can traverse into each of the position states in such an order that the deflection magnitude from one position state to the next position state is as small as possible. In this way, an inertial conflict between two discontinuous polarization directions can be reduced, and the power is saved.

It can be understood that, in the present embodiment, since one section of one micromirror unit 6080 corresponds to one pixel of the light modulation device 608, when one micromirror unit 6080 is illuminated multiple times, the time for the light modulation device 608 to modulate image light corresponding to one pixel is changed from modulating one pixel per unit time to modulating the image light corresponding to a plurality of pixels per unit time. In this way, the micromirror unit 6080 is required to modulate a plurality of pixels in the time for modulating original one pixel. In the present embodiment, a modulation frequency (the number of pixels modulated in a unit time) of the light modulation device 608 is a multiple of a refresh frequency of the image (the number of image frames displayed in a unit time), and the multiple is equal to the number of sections of one micromirror unit 6080. For example, if the micromirror unit 6080 includes four sections, it is change from the light modulation device 608 of modulating the image light corresponding to one pixel per unit time to the light modulation device 608 of modulating the image light corresponding to four pixels per unit time. In this case, the modulation frequency of the light modulation device 608 can be controlled to be 4 times the refresh frequency, in order to satisfy the requirement for processing four pixels.

Based on the operation principle of the light deflecting device, the micromirror unit 6080 can rapidly rotate the micromirror to generate different reflection angles by a binary-state electrostatic adsorption disposed on a bottom substrate, allowing the reflected light to enter or avoid the camera lens, thereby achieving a grayscale of the image. The existing light deflecting device has a micromirror flip angle of ±10°. The micromirror flip angle can increase to be ±12°, or even 17° to distinguish the light in "On" state from the light in "Off" state, thereby increasing the contrast.

The micromirror unit takes 2 us for each flip, and after the flip, a certain time for mechanical stabilization i.e., a time for rotating into the required place and being stabilized, is about 15 us. Therefore, the least significant bit of the light modulation device is about 20 us, and the time for mechanical stabilization will increase with the increase of the flip angle, which can cause an image grayscale problem occurred in the light modulation device under a high refresh frequency.

When a laser is used as the exciting light, a light cone angle of the illumination sub-beam incident to the light modulation device 608 is relatively smaller due to a smaller optical etendue of the exciting light of the laser. In the meantime, under a same contrast requirement, the flip angle of the light modulation device is required to be small, which is beneficial to reducing the time for mechanical stabilization of the micromirror unit. In an embodiment, the flip angle of the micromirror unit 6080 can be reduced to ±6°, and the time for mechanical stabilization can be reduced to shorter than 10 us. In this way, the light modulation device can meet the requirement of a high refresh frequency by reducing the flip angle of the micromirror unit.

In addition, according to the grating equation $m\lambda=d(\sin\alpha+\sin\beta)$, when the illumination sub-beam is incident with an incidence angle $\alpha$ to the light modulation device and d is a grating constant, the smaller a size of the micromirror unit, the greater an angle $\beta$ of the diffracted light; and if the angle $\beta$ of the diffracted light is greater, most of the diffracted light cannot be used by the camera lens, which reduces the light efficiency and contrast. Since the red light in the visible light band has a longer wavelength $\lambda$, the diffraction angle $\beta$ thereof will be greater. In this way, less red light can be collected by the camera lens than the blue and green light, which is unfavorable to an overall brightness of the light source and a ratio of the red light.

The projection system cyclically deflects the illumination sub-beam to each section of a corresponding micromirror unit through the deflection of the light deflecting device, and thus a high-resolution projection screen can be guaranteed by using a chip in which micromirror unit has relatively large size or without changing the size of the micromirror unit. It is also conducive to reducing or even avoiding the diffraction effect of light, and it can also reduce or even avoid the diffraction effect of the red light having a longer wavelength in the visible light band.

Embodiment 2

Figure 5:
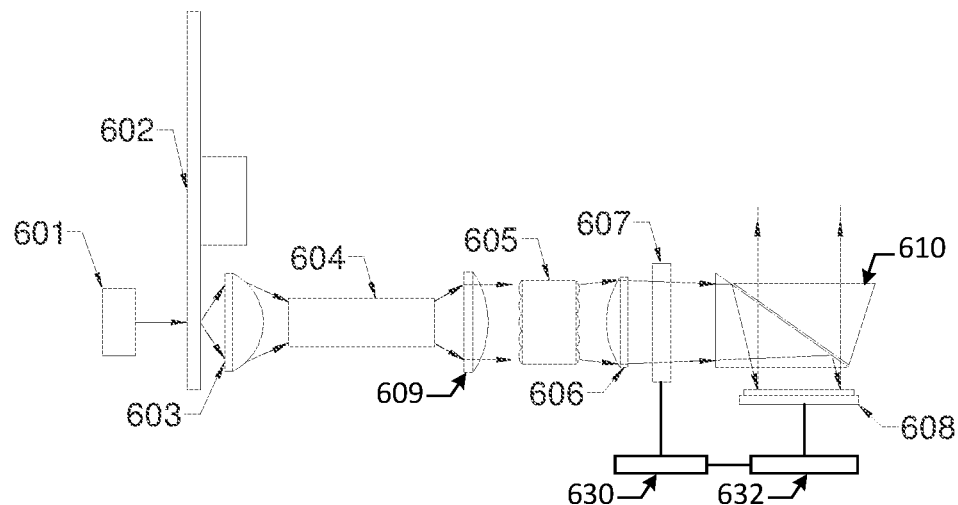
FIG. 5 is a schematic diagram of a projection system according to another embodiment of the present disclosure.

FIG. 5 is a schematic diagram of a projection system according to a second preferred embodiment of the present disclosure. Compared to the first preferred embodiment, the present projection system further comprises a control device 630 and a processing device 632. Other elements of the projection system in the second preferred embodiment are the same as those included in the first preferred embodiment, and thus the functions and positional relationships of the same elements will not be repeated herein.

In the present embodiment, the control device 630 can be configured to control the deflection of the light deflecting device 607. The control device 630 controls the deflection of the light deflecting device 607 to cyclically deflect the illumination sub-beam to each section of a corresponding micromirror unit, thereby realizing a high-resolution projection screen.

The processing device 632 can be configured to receive a video source and decode the video source. The processing device 632 can obtain image data after decoding the video source. In an embodiment, the video source can include a plurality of image frames, and the image data correspond to information of one image frame of the video source. The processing device 632 can also be configured to periodically transmit corresponding image data to the light modulation device 608 according to a number of frames of the video source, so that the light modulation device 608 periodically modulates one or more illumination sub-beams after being deflected by the light deflecting device 607.

Preferably, the light modulation device 608 can modulate the corresponding illumination sub-beam in one modulation period according to the image data corresponding to one frame, so as to form image light corresponding to the image data of one frame. In one embodiment, one modulation period can correspond to a time period for modulating one frame of image data. For example, when a refresh frequency of the images included in the video source is 60 Hz (hertz), the modulation period can be 1/60 s (second).

In the present embodiment, the processing device 632 can decode the video source by a processor or chip with digital processing capabilities. In the present embodiment, the processor can be, but is not limited to, a DSP (Digital Signal Processor), a microprocessor, and the like.

Figure 6:
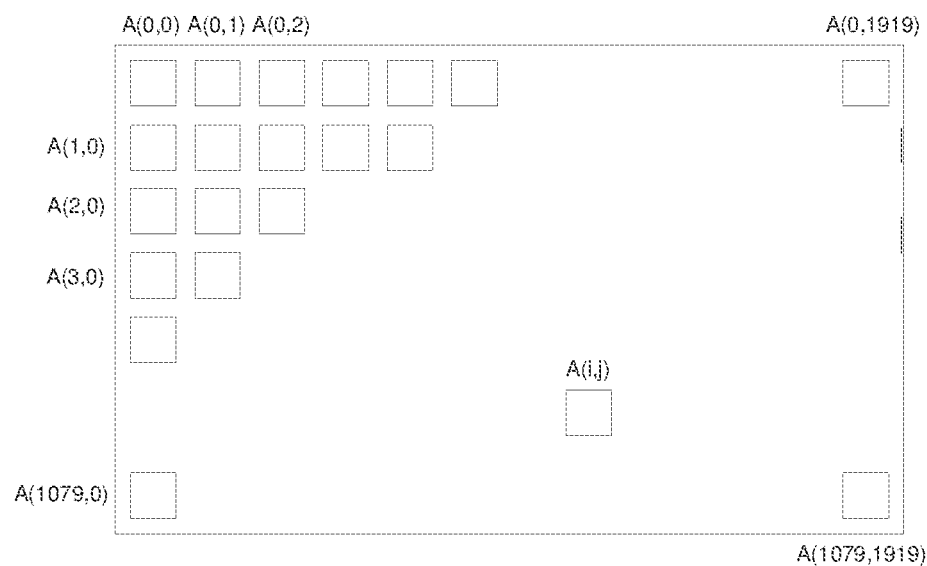
FIG. 6 is a schematic diagram of pixels of image data shown in FIG. 5 according to an embodiment of the present disclosure.

In combination with FIG. 6, the processing device 632 is further configured to extract, from the image data, the data of the pixel corresponding to the section of the light modulation device 608 that modulates the image light in a same modulation period, as image data corresponding to one modulation period, thereby obtaining image data corresponding to each modulation period required for modulating the image light by the light modulation device 608.

In the present embodiment, the video source can support images with different resolutions. For example, the video source has a video image with a resolution of 1920*1080. In this way, among the image data obtained after the processing device 632 performs the decoding, each set of the image data can include 1920*1080 pixels (i.e., one image frame includes 1920*1080 pixels), and each pixel has information such as brightness and color. The processing device 632 takes the image data of one frame as the image data to be modulated in one modulation period (such as a time period for processing the image data of one frame), and the light modulation device 608 can modulate the one or more illumination sub-beams according to the image data in the modulation period. In other embodiments, the processing device 632 can be configured to perform a sub-packaging processing on the image data, so as to extract, from the image data, the data of the pixel corresponding to the section of the light modulation device 608 that modulates the image light in the same modulation period.

It can be understood that, according to the number of sections of the micromirror unit 6080, the processing device 632 can extract, from the image data, the data of pixel corresponding to the section of the light modulation device 608 that modulates image light in the same modulation period. The image data are packaged to obtain data packages, the number of which corresponds to the number of sections of the micromirror unit 6080. For example, each data package corresponds to the data of a pixel corresponding to a section of the light modulation device 608 that modulates the image light in a same modulation period in one-to-one correspondence. For example, the micromirror unit 6080 includes four sections, and the processing device 632 can divide the image data of 1920*1080 pixels into four data packages.

Figure 7:
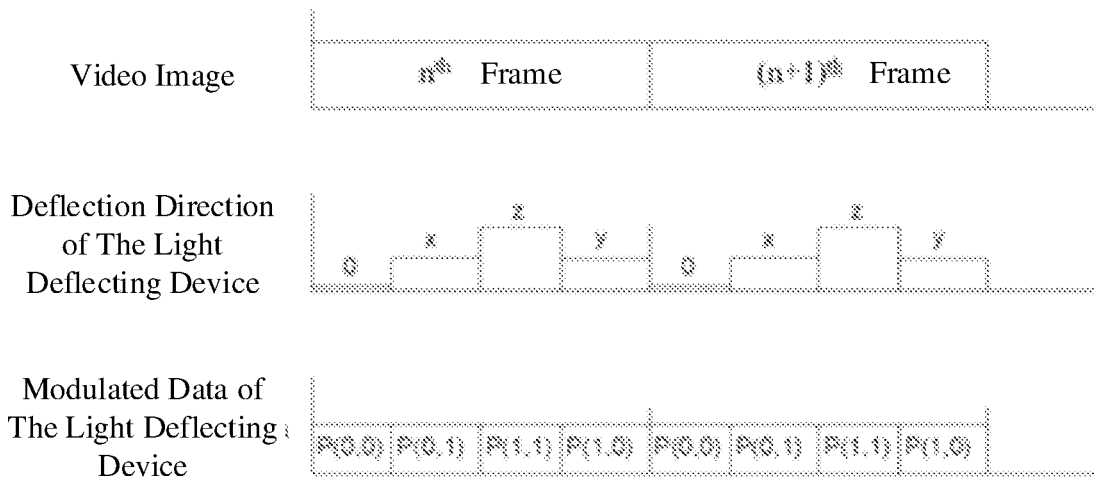
FIG. 7 is a schematic diagram of a video image processing shown in FIG. 5 according to an embodiment of the present disclosure.

Preferably, in combination with FIG. 7, the processing device 632 can first extract the data of the pixels A(0, 0), A(0, 2), . . . , A(i, j) from the image data as a data package P(0, 0), where i is 0 or an even number in the interval [0, 1080], and j is 0 or an even number in the interval [0, 1920). The data package P(0, 0) can correspond to the data of pixel corresponding to the section A of the light modulation device 608 that modulates the image light in the same modulation period.

The processing device 632 can extract the data of the pixels A(0, 1), A(0, 3), . . . , A(i, j) from the image data as a data package P(0, 1), where i is 0 or an even number in the interval [0, 1080], and j is 0 or an odd number in the interval [0, 1920). The data package P(0, 1) can correspond to the data of pixel corresponding to the section B of the light modulation device 608 that modulates the image light in the same modulation period.

The processing device 632 can extract the data of the pixels A(1, 0), A(1, 2), . . . , A(i, j) from the image data as a data package P(1, 0), where i is an odd number in the interval [0, 1080), and j is 0 or an even number in the interval [0, 1920). The data package P(1, 0) can correspond to the data of pixel corresponding to the section D of the light modulation device 608 that modulates the image light in the same modulation period.

The processing device 632 can extract the data of the pixels A(1, 1), A(1, 3), . . . , A(i, j) from the image data as a data package P(1, 1), where i is an odd number in the interval [0, 1080), and j is an odd number in the interval [0, 1920). The data package P(1, 1) can correspond to the data of pixel corresponding to the section C of the light modulation device 608 that modulates the image light in the same modulation period. In other words, the processing device 632 divides the image data into four data packages P(0, 0), P(0, 1), P(1, 0), and P(1, 1).

The processing device 632 can also configured to provide the light modulation device 608 with corresponding image data in each modulation period when the light modulation device 608 is modulating the image, so that each micromirror unit of the light modulation devices modulates the image light in different modulation periods according to the corresponding image data.

In the present embodiment, the processing device 632 can provide the light modulation device 608 with the data packages P(0, 0), P(0, 1), P(1, 0), and P(1, 1) in each modulation period. In this way, each micromirror unit 6080 of the light modulation device 608 can modulate the image light according to the data packages P(0, 0), P(0, 1), P(1, 0), and P(1, 1) in different modulation periods. For example, the processing device 632 can provide the light modulation device 608 with the data packages P(0, 0), P(0, 1), P(1, 0), and P(1, 1) corresponding to image data of a first frame in a first modulation period; and the processing device 632 can also provide the light modulation device 608 with the data packages P(0, 0), P(0, 1), P(1, 0), and P(1, 1) corresponding to image data of a second frame in a second modulation period. In this way, the light modulation device 608 can modulate the illumination sub-beam according to the data packages P(0, 0), P(0, 1), P(1, 0), and P(1, 1) corresponding to the image data of the first frame in the first modulation period; and can also modulate the illumination sub-beam according to the data packages P(0, 0), P(0, 1), P(1, 0), and P(1, 1) corresponding to the image data of the second frame in the second modulation period.

The image data package obtained by the light modulation device 608 in one modulation period includes image data of the pixel corresponding to the irradiated section of the light modulation device in this modulation period.

It can be understood that, in one modulation period, after one or more illumination sub-beams are deflected by the light deflecting device 607, when the illumination sub-beam is shifted to the section A of the micromirror unit 6080, the processing device 632 can provide the data package P(0, 0)

of the image data to the light modulation device 608. That is, the data package P(0, 0) of the image data corresponds to image data of the pixel corresponding to the section A of the micromirror unit 6080 that is irradiated by the illumination sub-beam, and at this time, the light modulation device 608 can modulate the illumination sub-beam according to the data package P(0, 0) of the image data. In one modulation period, after one or more illumination sub-beams are deflected by the light deflecting device 607, when the illumination sub-beam is shifted to the section B of the micromirror unit 6080, the processing device 632 can provide the data package P(0, 1) of the image data to the light modulation device 608. That is, the data package P(0, 1) of the image data corresponds to image data of the pixel corresponding to the section B of the micromirror unit 6080 that is irradiated by the illumination sub-beam, and at this time, the light modulation device 608 can modulate the illumination sub-beam according to the data package P(0, 1) of the image data. In one modulation period, after one or more illumination sub-beams are deflected by the light deflecting device 607, when the illumination sub-beam is shifted to the section D of the micromirror unit 6080, the processing device 632 can provide the data package P(1, 1) of the image data to the light modulation device 608. That is, the data package P(1, 1) of the image data corresponds to image data of the pixel corresponding to the section D of the micromirror unit 6080 that is irradiated by the illumination sub-beam, and at this time, the light modulation device 608 can modulate the illumination sub-beam according to the data package P(1, 1) of the image data. In one modulation period, after one or more illumination sub-beams are deflected by the light deflecting device 607, when the illumination sub-beam is shifted to the section C of the micromirror unit 6080, the processing device 632 can provide the data package P(1, 0) of the image data to the light modulation device 608. That is, the data package P(1, 0) of the image data corresponds to image data of the pixel corresponding to the section C of the micromirror unit 6080 that is irradiated by the illumination sub-beam, and at this time, the light modulation device 608 can modulate the illumination sub-beam according to the data package P(1, 0) of the image data.

In the present embodiment, the processing device 632 can also be configured to generate a corresponding synchronization signal according to corresponding image data provided to the light modulation device 608 in each modulation period. The control device 630 can be configured to control the deflection of the light deflecting device 607 according to the synchronization signal, such that the light deflecting device 607 can be controlled to be in a corresponding position state according to the synchronization signal, and then the illumination sub-beam is controlled to be cyclically deflected to each section of the corresponding micromirror unit.

Preferably, the synchronization signal can include synchronization periods, and each synchronization period is a time period for the light modulation device 608 to modulate the image data, such as a time period for modulating image data of one frame. When the control device 630 controls the light deflecting device 607 to be in a corresponding position state according to the synchronization signal, the light modulation device 608 modulates the image data of the pixel corresponding to the section that is irradiated in the corresponding position state of the light modulation device 608. For example, each synchronization period can include a first time period, a second time period, a third time period, and a fourth time period, which respectively correspond to the time periods for the light modulation device 608 to modulate the data packages P(0, 0), P(0, 1), P(1, 0), and P(1, 1) among the image data.

It can be understood that, in the first time period of one synchronization period of the synchronization signal, the control device 630 can control the light deflecting device 670 to be at 0 deflection (the initial position state), the processing device 632 can provide the data package P(0, 0) to the light modulation device 608. At this time, the light modulation device 608 can modulate a plurality of received illumination sub-beams according to the data package P(0, 0). In the present embodiment, the light modulation device 608 can modulate the illumination sub-beam according to height and color information of the pixels included in the data package P(0, 0).

In the second time period of one synchronization period of the synchronization signal, the control device 630 can control the light deflecting device 607 to deflect about the x-deflection axis, the processing device 632 can provide the data package P(0, 1) to the light modulation device 608. At this time, the light modulation device 608 can modulate a plurality of received illumination sub-beams according to the data package P(0, 1). In the present embodiment, the light modulation device 608 can modulate the illumination sub-beam according to height and color information of the pixels included in the data package P(0, 1).

In the third time period of one synchronization period of the synchronization signal, the control device 630 can control the light deflecting device 607 to deflect about the z-deflection axis, the processing device 632 can provide the data package P(1, 0) to the light modulation device 608. At this time, the light modulation device 608 can modulate a plurality of received illumination sub-beams according to the data package P(1, 0). In the present embodiment, the light modulation device 608 can modulate the illumination sub-beam according to height and color information of the pixels included in the data package P(1, 0).

In the fourth time period of one synchronization period of the synchronization signal, the control device 630 can control the light deflecting device 607 to deflect about the y-deflection axis, the processing device 632 can provide the data package P(1, 1) to the light modulation device 608. At this time, the light modulation device 608 can modulate a plurality of received illumination sub-beams according to the data package P(1, 1). In the present embodiment, the light modulation device 608 can modulate the illumination sub-beam according to height and color information of the pixels included in the data package P(1, 1).

In one synchronization period of the synchronization signal, the control device 630 can control the position state of the light deflecting device 607 to be cyclically in position states 0 deflection→x axis deflection→z axis deflection→y axis deflection (i.e., in the clockwise direction), and the sections of the micromirror unit 6080 of the light modulation device 608, in an order of section A→section B→section D>section C, modulates the illumination sub-beam according to corresponding data packages in a timing sequence, thereby finishing the modulation of the image data. In this way, through controlling the light deflecting device 607 to deflect in the clockwise direction, the inertial conflict between two discontinuous polarization directions can be reduced, and the power is also saved.

In the present embodiment, from one modulation period to the next modulation period, the light deflecting device 607 shifts the illumination sub-beam from one section to the next section of the micromirror unit. For example, in one modulation period, the light deflecting device 607 can control the illumination sub-beam to irradiate the section A of the micromirror unit 6080 according to the synchronization signal, and the light modulation device 608 can modulate the illumination sub-beam according to the data package P(0, 0) in one frame of the image data; when going into the next modulation period, the light deflecting device 607 cyclically controls the illumination sub-beam to irradiate the section A of the micromirror unit 6080 according to the synchronization signal, and at this time, the light modulation device 608 can modulate the illumination sub-beam according to the data package P(0, 0) in the image data of the next frame. In this way, image data of each frame in the video source can be modulated to generate a continuous projection effect.

Embodiment 3

Figure 8:
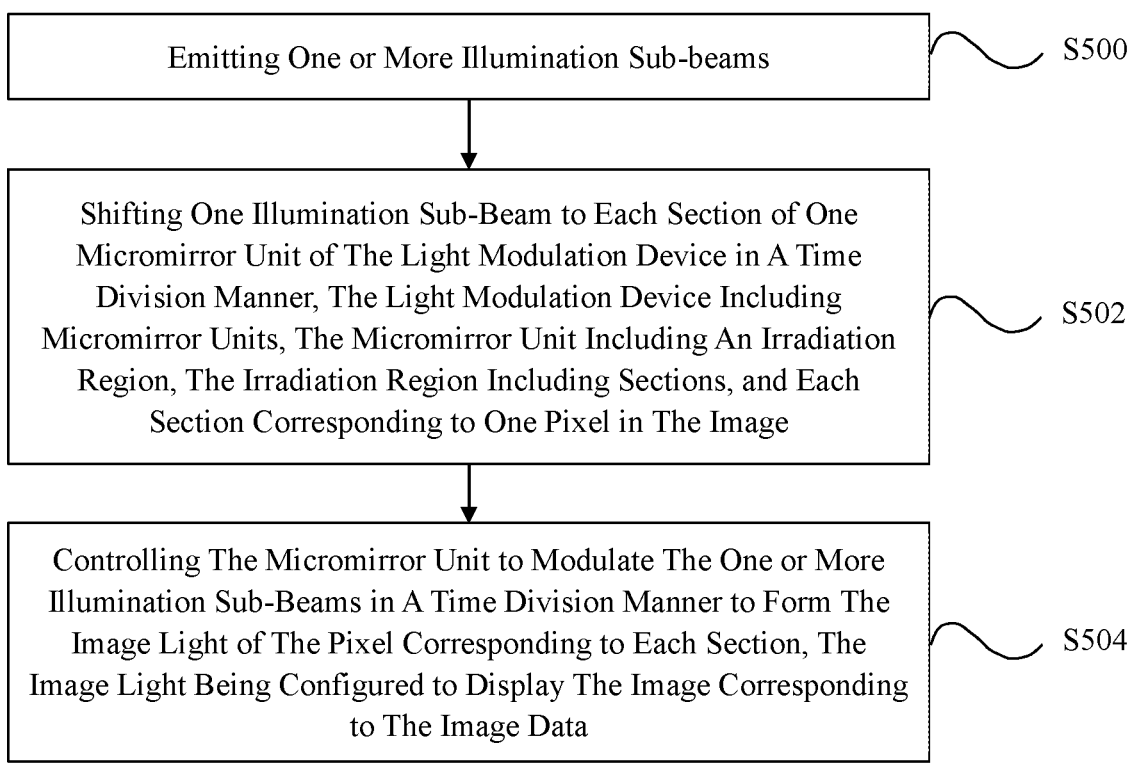
FIG. 8 is a flowchart of a projection method applied to a projection system according to an embodiment of the present disclosure.

With reference to FIG. 8, a projection method applied to the projection system according to a first preferred embodiment includes the following steps.

At step S500, one or more illumination sub-beams are emitted.

The illumination system can emit the one or more of the illumination sub-beam.

At step S502, one illumination sub-beam is shifted to each section of one micromirror unit of the light modulation device in a time division manner. The light modulation device includes micromirror units, the micromirror unit includes an irradiation region, the irradiation region includes sections, and each section corresponds to one pixel in the image.

In the present embodiment, the light deflecting device can shift one illumination sub-beam to each section of one micromirror unit in a time division manner. Each micromirror unit includes an irradiation region, and the irradiation region includes sections. In the present embodiment, the irradiation region of one micromirror unit includes four sections that are defined by two intersecting dividing lines, and the illumination sub-beam is sequentially shifted to the four sections of the micromirror unit in a clockwise or counterclockwise direction. The four sections can be represented as section A, section B, section C, and section D. Each of the four sections corresponds to one pixel in the image. It can be understood that, the section A can be located at lower left of the four sections, the section B can be located at upper left of the four sections, the section D can be located at upper right of the four sections, and the section C can be located at lower right of the four sections. That the illumination sub-beam is sequentially shifted to the four sections of the one micromirror unit 6080 in the clockwise direction indicates that the illumination sub-beam is shifted from the section A, to the section B, then to the section D, and then to the section C. That the illumination sub-beam is sequentially shifted to the four sections of the one micromirror unit 6080 in the counterclockwise direction indicates that the illumination sub-beam is shifted from the section A, to the section C, then to the section D, and then to the section B.

In the present embodiment, the light deflecting device can have four position states corresponding to the four sections of the micromirror unit in a one-to-one correspondence. For example, the light deflecting device can have an initial state (a first position state), a second position state, a third position state, and a fourth position state.

Preferably, under the control of the control device (shown in FIG. 5), the light deflecting device can perform a deflection, such as deflections about different deflection axes in a space, so as to allow the light deflecting device having the four position states. In the present embodiment, the light deflecting device can be a square flat plate, and under the control of the control device, the light deflecting device can be deflected about a plurality of deflection axes located in the plane of the light deflecting device.

Preferably, the light deflecting device can perform deflections about a first deflection axis, a second deflection axis, and a third deflection axis. The first deflection axis and the second deflection axis are perpendicular to each other, the third deflection axis is located between the first deflection axis and the second deflection axis, and the light deflecting device can tilt sequentially with respect to the first deflection axis, the second deflection axis, and the third deflection axis, so as to achieve the purpose of deflection. It can be understood that the light deflecting device can include a first side, a second side, a third side, and a fourth side (not shown). The first side, the second side, the third side, and the fourth side are connected end-to-end to form the square flat plate. Preferably, the first deflection axis (x) is parallel to the first side or the third side; the second deflection axis (y) is parallel to the second side or the fourth side; the first side and the second side intersect at a first intersection side, the third side and the fourth side intersect at a second intersection side, and the third deflection axis (z) is parallel to a line connecting the first intersection side to the second intersection side (i.e., a diagonal line of the square flat plate).

In another embodiment, the number of deflection axes, about which the light deflecting device is deflected, is not limited to three. For example, it can be two or other number. In other embodiments, the number of sections included in each micromirror unit can be greater or smaller than the number of position states of the light deflecting device, and the number of sections included in each micromirror unit is not necessarily be equal to the number of position states of the light deflecting device.

At step S504, the micromirror unit is controlled to modulate the one or more illumination sub-beams in a time division manner to form the image light of the pixel corresponding to each section. The image light is configured to display the image corresponding to the image data.

It can be understood that, when the light deflecting device performs the deflection, the illumination sub-beam has an incident angle with respect to an incident optical axis of the light deflecting device, and the illumination sub-beam is refracted in the light deflecting device when it is transmitted through the light deflecting device, such that the illumination sub-beam deviates from the exit optical axis and the incident optical axis of the light deflecting device, such as offset smaller than one pixel. Therefore, when the light deflecting device is deflected, the imaging position of the illumination sub-beam on the corresponding micromirror unit may change. For example, the micromirror unit irradiated by the illumination spot may change from the first section of the micromirror unit to the second section of the micromirror unit adjacent to the first section.

When the light deflecting device is deflected, the light deflecting device can shift the illumination sub-beam to each section of a corresponding micromirror unit in a time division manner, such that the illumination sub-beam can cyclically irradiate each section of the corresponding micromirror. In this way, the illumination sub-beam can be cyclically deflected to each section of the corresponding micromirror.

In the present embodiment, each of the plurality of sections of the micromirror unit 6080 can correspond to one pixel on the image. It can be understood that, the image can contain 1080*1920 pixels (shown in FIG. 6), and each pixel can be represented as A (i, j), where i is a number in an interval [0, 1080), j is a number in an interval [0, 1920). One section of the micromirror unit 6080 can correspond to one pixel in the image, for example, the first section can correspond to a pixel A (17, 7). Different sections correspond to different pixels, for example, the second section can correspond to pixel A (7, 4). The pixels corresponding to the sections of one micromirror unit 6080 are adjacent pixels in the image. For example, the section A, the section B, the section D, and the section C of one micromirror unit 6080 can correspond to a pixel A (1, 0), a pixel A (0, 0), a pixel A (0, 1), and a pixel A (1, 1) on the image, respectively, and the pixel A (1, 0), the pixel A (0, 0), the pixel A (0, 1), and the pixel A (1, 1) are adjacent pixels.

Since each section can be one pixel and each micromirror unit has a plurality of sections, one illumination sub-beam can cyclically irradiate each section of one micromirror unit to illuminate the micromirror unit for multiple times, i.e., to display a plurality of pixels of the corresponding image in one micromirror unit. Therefore, a high-resolution projection screen can be realized through the light modulation device with a relatively low resolution.

Preferably, when the light deflecting device is not deflected (i.e., in the initial position state or the first position state), the illumination sub-beam can irradiate the section A of the corresponding micromirror unit. When the light deflecting device is deflected about the x deflection axis (in the second position state), the illumination sub-beam can irradiate the section B of the corresponding micromirror unit. When the light deflecting device is deflected about the z deflection axis (in the third position state), the illumination sub-beam can irradiate the section D of the corresponding micromirror unit. When the light deflecting device is deflected about the y deflection axis (in the fourth position state), the illumination sub-beam can irradiate the section C of the corresponding micromirror unit.

Therefore, when the light deflecting device is deflected around different deflection axes, the micromirror unit of the light modulation device can be illuminated for multiple times, and one section of each micromSirror unit can be a pixel, thereby achieving a high-resolution projection screen.

In the present embodiment, the light deflecting device can be cyclically deflected around the plurality of deflection axes, such that the illumination sub-beam is cyclically deflected to each corresponding section of the micromirror unit. In the present embodiment, the light deflecting device can traverse each of the position states in such an order that the deflection magnitude from one position state to the next position state is as small as possible. For example, the control device can control the light deflecting device to be in position states corresponding to 0 deflection→x axis deflection→z axis deflection→y axis deviation→0 deflection, cyclically. In this case, the order of the sections of the micromirror unit is the section A→the section B→the section D→the section C→the section A. Thus, if the illumination sub-beam is deflected in a clockwise direction, the sections of the micromirror unit are irradiated by the illumination sub-beam in an order of the section A>the section B>the section D>the section C. In other embodiments, with the deflection of the light deflecting device, the illumination sub-beam can also be deflected to the corresponding sections of the micromirror unit in the counterclockwise direction. In the present embodiment, by controlling the deflection of the light deflecting device, the illumination sub-beam can irradiate each of the sections of the micromirror unit in the counterclockwise or clockwise direction, and the light deflecting device 607 can traverse each of the position states in such an order that the deflection magnitude from one position state to the next position state is as small as possible. In this way, an inertial conflict between two discontinuous polarization directions can be reduced, and the power is saved.

In addition, it can be understood that, in the present embodiment, since one section of one micromirror unit corresponds to one pixel of the light modulation device, when one micromirror unit is irradiated for multiple times, the time for the light modulation device to modulate the image light corresponding to one pixel is changed from modulating the image light corresponding to one pixel per unit time to modulating the image light corresponding to a plurality of pixels per unit time. In this way, the micromirror unit is required to modulate a plurality of pixels in the time for modulating original one pixel. In the present embodiment, a modulation frequency (the number of pixels modulated in a unit time) of the light modulation device is a multiple of a refresh frequency of the image (the number of image frames displayed in a unit time), and the multiple is equal to the number of the sections of one micromirror unit. For example, if the micromirror unit includes four sections, it is change from the light modulation device of modulating the image light corresponding to one pixel to the light modulation device of modulating the image light corresponding to four pixels per unit time. In this case, the modulation frequency of the light modulation device can be controlled to be 4 times the refresh frequency, in order to satisfy the requirement for processing four pixels.

Embodiment 4

Figure 9:
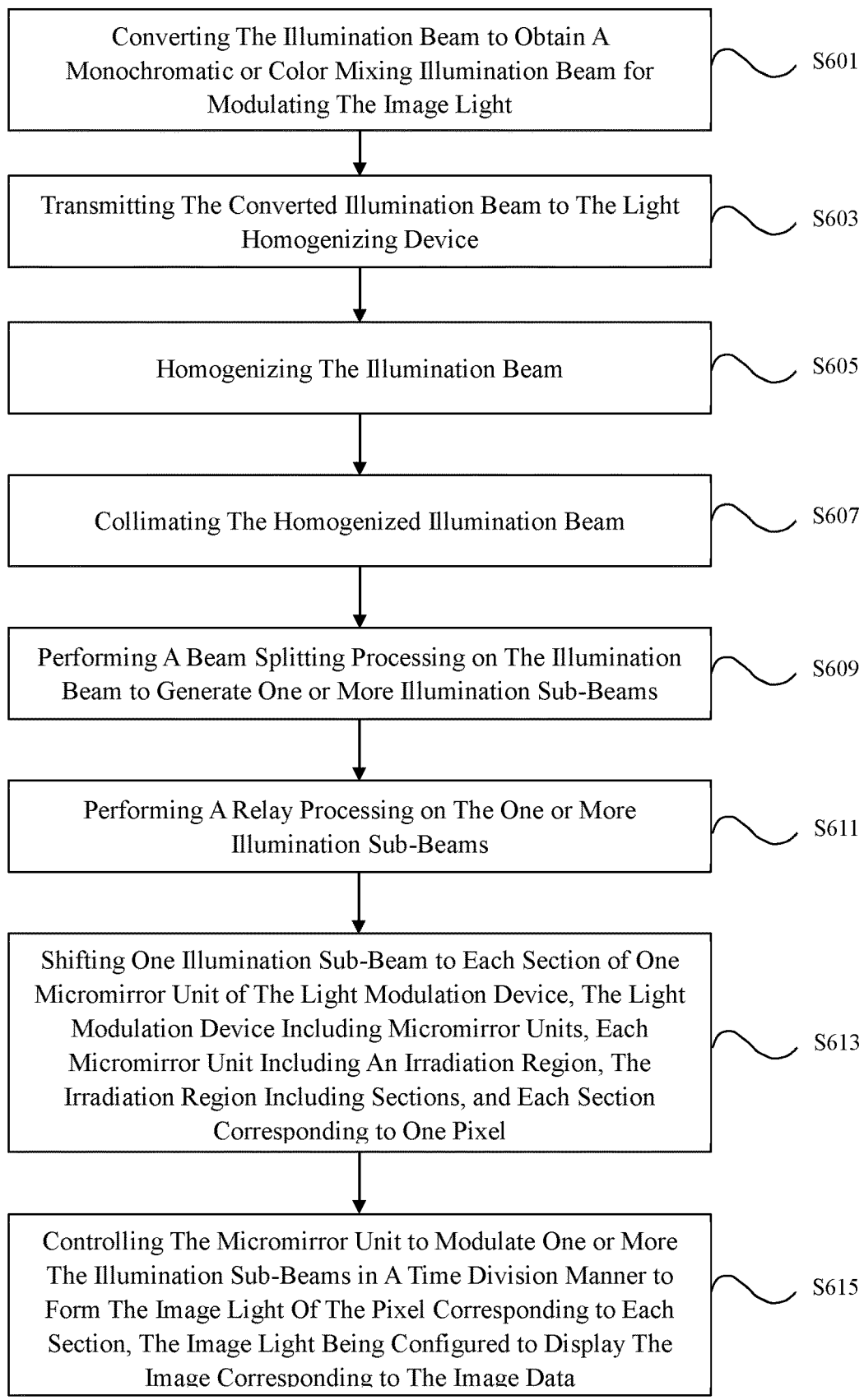
FIG. 9 is a flowchart of a projection method applied to a projection system according to another embodiment of the present disclosure.

Referring to FIG. 9, a projection method applied to the projection system according to a second preferred embodiment includes the following steps.

At step S601, the illumination beam is converted to obtain a monochromatic or color mixing illumination beam for modulating the image light.

As described above, the illumination beam can be converted by using filter wheel or fluorescent wheel. The fluorescent wheel can be a transmissive fluorescent wheel or a reflective fluorescent wheel, or other types of color wheel.

At step S603, the converted illumination beam is transmitted to the light homogenizing device.

The collecting lens can couple the illumination beam separated by the color wheel to the light homogenizing device.

At step S605, the illumination beam is subjected to a homogenization.

The light homogenizing device can perform the homogenization on the illumination beam. In the present embodiment, the illumination beam can be a rectangular illumination spot, and the light homogenizing device can be a square rod.

At step S607, the homogenized illumination beam is collimated.

The lens can perform the collimation on the illumination beam, such that the processed outgoing beam is incident to the microlens array with a small angle.

At step S609, the illumination beam is subjected to a beam splitting processing to generate one or more illumination sub-beams.

The microlens array can perform the beam splitting on the illumination beam. The microlens array can include an incident surface and an exit surface, and a plurality of microlens unit groups are provided on the incident surface and the exit surface. Each microlens unit group includes a first microlens unit disposed on the incident surface of the microlens array and a second microlens unit correspondingly disposed on the exit surface of the microlens array. A focus point of each first microlens unit coincides with a center of a corresponding second microlens unit. It can be understood that the second microlens unit of each microlens unit group is located on a focal plane of the first microlens unit. Thus, when the illumination beam is incident on the incident surface of the first microlens unit, the outgoing beam is focused at the center of the second microlens unit after passing through the first microlens unit and being focused by the first microlens unit, so as to form the one or more illumination sub-beams. In the present embodiment, the second microlens unit disposed on the exit surface of the microlens array corresponds to the micromirror unit of the light modulation device in one-to-one correspondence, such that each illumination sub-beam can transmit through the light deflecting device to irradiate the corresponding micromirror unit. In the present embodiment, the second microlens units on the exit surface of the microlens array can be arranged in a matrix.

At step S611, the one or more illumination sub-beams are subjected to a relay processing.

At step S613, one illumination sub-beam is shifted to each section of one micromirror unit of the light modulation device, the light modulation device comprises a plurality of micromirror units, each micromirror unit includes an irradiation region, the irradiation region includes a plurality of sections, and each section corresponds to one pixel on the image.

The step S613 is the same as the step S502 illustrated in Embodiment 3, which is not repeated herein.

At step S615, the micromirror unit modulate the one or more illumination sub-beams in a time division manner to form the image light of the pixel corresponding to each section. The image light is configured to display the image corresponding to the image data.

The step S615 is the same as the step S504 illustrated in Embodiment 3, which is not repeated herein.

Embodiment 5

Figure 10:
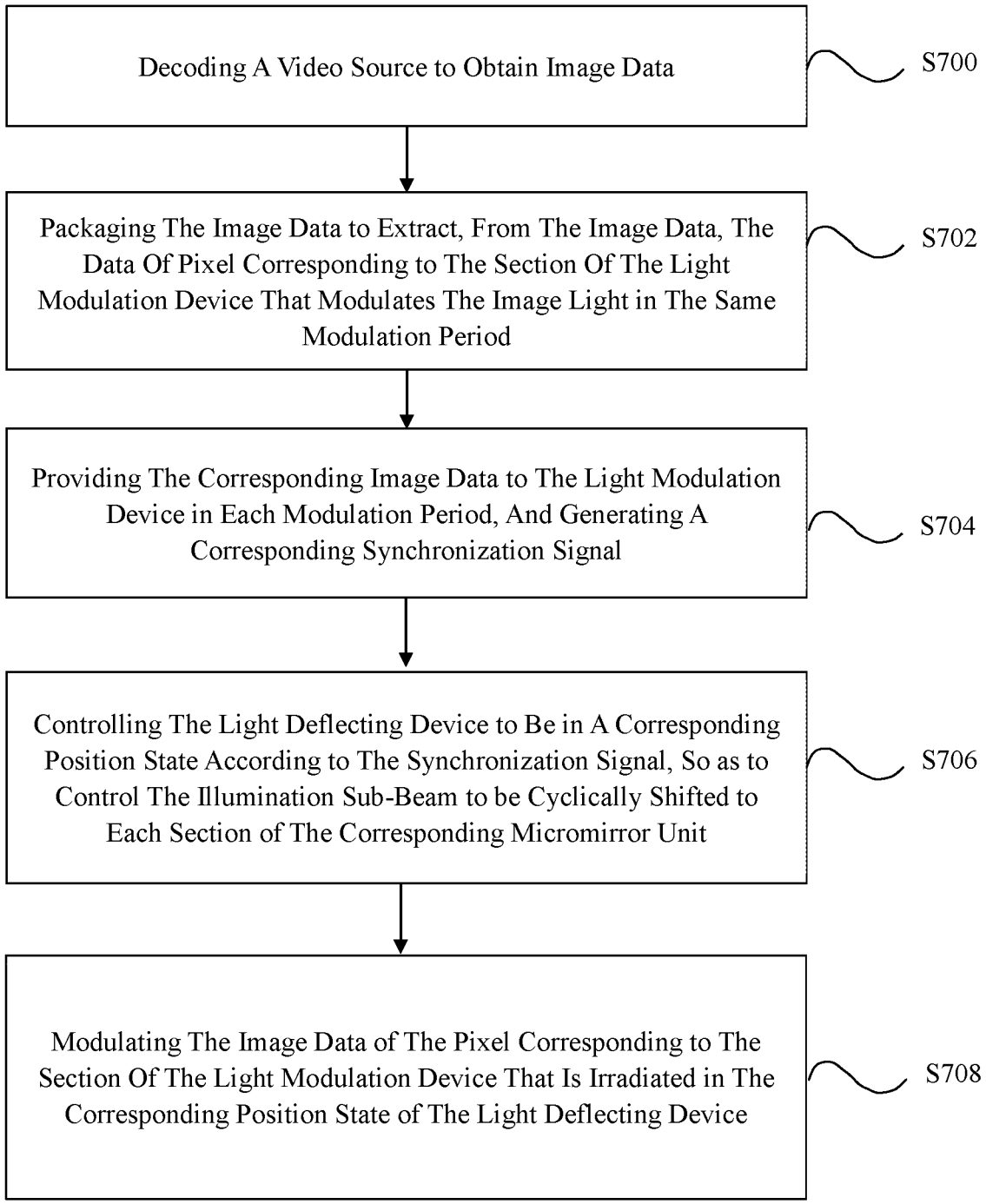
FIG. 10 is a flowchart of a projection method applied to a projection system according to yet another embodiment of the present disclosure.

Referring to FIG. 10, a projection method applied to the projection system according to a third preferred embodiment includes the following steps.

At step S700, a video source is decoded to obtain image data.

In the present embodiment, the video source can support images of different resolutions. For example, the video source has a video image with a resolution of 1920*1080. In this way, among the image data obtained after the processing device performs the decoding, each set of image data can include 1920*1080 pixels (i.e., one image frame includes 1920*1080 pixels), and each pixel can include information such as brightness and color. The processing device takes the image data of one frame as the image data to be modulated in one modulation period (such as the time period for processing the image data of one frame), and the light modulation device can modulate the one or more illumination sub-beams according to the image data in the modulation period.

At step S702, the image data are subjected to a packaging processing to extract, from the image data, the data of pixel corresponding to the section of the light modulation device that modulates the image light in the same modulation period.

It can be understood that, according to the number of sections of the micromirror unit, the processing device can extract, from the image data, the data of pixel corresponding to the section of the light modulation device that modulates image light in the same modulation period. The image data are packaged to obtain data packages whose number corresponds to the number of sections of the micromirror unit. For example, each data package corresponds to the data of a pixel corresponding to a section of the light modulation device that modulates the image light in the same modulation period in one-to-one correspondence. For example, the micromirror unit comprises four sections, and the processing device can divide the image data of 1920*1080 pixels into four data packages.

Preferably, the processing device can first extract the data of the pixels A(0, 0), A(0, 2), . . . , A(i, j) from the image data to form a data package P(0, 0), where i is 0 or an even number in the interval [0, 1080), and j is 0 or an even number in the interval [0, 1920); and the data package P(0, 0) can correspond to the data of pixel corresponding to the section A of the light modulation device that modulates the image light in the same modulation period.

The processing device can extract the data of the pixels A(0, 1), A(0, 3), . . . , A(i, j) from the image data to form a data package P(0, 1), where i is 0 or an even number in the interval [0, 1080), and j is 0 or an odd number in the interval [0, 1920); and the data package P(0, 1) can correspond to the data of pixel corresponding to the section B of the light modulation device that modulates the image light in the same modulation period.

The processing device can extract the data of the pixels A(1, 0), A(1, 2), . . . , A(i, j) from the image data to form a data package P(1, 0), where i is an odd number in the interval [0, 1080), and j is 0 or an even number in the interval [0, 1920); and the data package P(1, 0) can correspond to the data of pixel corresponding to the section D of the light modulation device that modulates the image light in the same modulation period.

The processing device can extract the data of the pixels A(1, 1), A(1, 3), . . . , A(i, j) from the image data to form a data package P(1, 1), where i is an odd number in the interval [0, 1080), and j is an odd number in the interval [0, 1920); and the data package P(1, 1) can correspond to the data of pixel corresponding to the section C of the light modulation device that modulates the image light in the same modulation period.

In other words, the processing device divides the image data into four data packages P(0, 0), P(0, 1), P(1, 0), and P(1, 1).

In the present embodiment, the processing device can provide the light modulation device with the data packages P(0, 0), P(0, 1), P(1, 0), and P(1, 1) in each modulation period. In this way, each micromirror unit of the light modulation device can modulate the image light according to the data packages P(0, 0), P(0, 1), P(1, 0), and P(1, 1) in different modulation periods. For example, the processing device can provide the light modulation device with the data packages P(0, 0), P(0, 1), P(1, 0), and P(1, 1) corresponding to image data of a first frame in a first modulation period; and the processing device can also provide the light modulation device with the data packages P(0, 0), P(0, 1), P(1, 0), and P(1, 1) corresponding to image data of a second frame in a second modulation period. In this way, the light modulation device can modulate the illumination sub-beam according to the data packages P(0, 0), P(0, 1), P(1, 0), and P(1, 1) corresponding to the image data of the first frame in the first modulation period; and can also modulate the illumination sub-beam according to the data packages P(0, 0), P(0, 1), P(1, 0), and P(1, 1) corresponding to the image data of the second frame in the second modulation period.

At step S704, the corresponding image data are provided to the light modulation device in each modulation period, and a corresponding synchronization signal is generated.

It can be understood that, in one modulation period, after the one or more illumination sub-beams are deflected by the light deflecting device, when the illumination sub-beam is shifted to the section A of the micromirror unit, the processing device can provide the data package P(0, 0) of the image data to the light modulation device. That is, the data package P(0, 0) of the image data corresponds to image data of the pixel corresponding to the section A of the micromirror unit that is irradiated by the illumination sub-beam, and at this time, the light modulation device can modulate the illumination sub-beam according to the data package P(0, 0) of the image data. In one modulation period, after the one or more illumination sub-beams are deflected by the light deflecting device, when the illumination sub-beam is shifted to the section B of the micromirror unit, the processing device can provide the data package P(0, 1) of the image data to the light modulation device. That is, the data package P(0, 1) of the image data corresponds to image data of the pixel corresponding to the section B of the micromirror unit that is irradiated by the illumination sub-beam, and at this time, the light modulation device can modulate the illumination sub-beam according to the data package P(0, 1) of the image data. In one modulation period, after the one or more illumination sub-beams are deflected by the light deflecting device, when the illumination sub-beam is shifted to the section D of the micromirror unit, the processing device can provide the data package P(1, 1) of the image data to the light modulation device. That is, the data package P(1, 1) of the image data corresponds to image data of the pixel corresponding to the section D of the micromirror unit that is irradiated by the illumination sub-beam, and at this time, the light modulation device can modulate the illumination sub-beam according to the data package P(1, 1) of the image data. In one modulation period, after the one or more illumination sub-beams are deflected by the light deflecting device, when the illumination sub-beam is shifted to the section C of the micromirror unit, the processing device can provide the data package P(1, 0) of the image data to the light modulation device. That is, the data package P(1, 0) of the image data corresponds to image data of the pixel corresponding to the section C of the micromirror unit that is irradiated by the illumination sub-beam, and at this time, the light modulation device can modulate the illumination sub-beam according to the data package of the image data.

In the present embodiment, after the image data are divided into packages, the processing device generates corresponding synchronization signal according to the corresponding the image data provided to the light modulation device in each modulation period, and outputs the synchronization signal to the control device.

Preferably, the synchronization signal can include a plurality of synchronization periods, and each synchronization period is a time period for modulating the image data by the light modulation device, such as a time period for modulating the image data of one frame. When the control device controls the light deflecting device to be in the corresponding position state according to the synchronization signal, the light modulation device modulates the image data of the pixel corresponding to the section of the light modulation device that is irradiated in the corresponding position state of the light deflecting device. For example, each synchronization period can include a first time period, a second time period, a third time period, and a fourth time period, which respectively correspond to the times when the light modulation device modulates the data packages P(0, 0), P(0, 1), P(1, 0), and P(1, 1) among the image data.

At step S706, the light deflecting device is controlled to be in a corresponding position state according to the synchronization signal, so as to control the illumination sub-beam to be cyclically shifted to each section of the corresponding micromirror unit.

Preferably, the synchronization signal can include synchronization periods, and each synchronization period is a time period for the light modulation device to modulate the image data. When the control device controls the light deflecting device to be in a corresponding position state according to the synchronization signal, the light modulation device modulates the image data of the pixel corresponding to the section that is irradiated in this corresponding position state of the light modulation device. For example, each synchronization period can include a first time period, a second time period, a third time period, and a fourth time period, which respectively correspond to the time periods for the light modulation device to modulate the data packages P(0, 0), P(0, 1), P(1, 0), and P(1, 1) of the image data.

In one synchronization period of the synchronization signal, the control device can control the position state of the light deflecting device to be cyclically in position states corresponding to 0 deflection→x axis deflection→z axis deflection→y axis deflection, and the sections of the micromirror unit of the light modulation device, in an order of the section A→the section B→the section D≥the section C, modulates the illumination sub-beam according to the corresponding data package in a timing sequence, thereby finishing the modulation of the image data. In this way, the inertial conflict between two discontinuous polarization directions can be reduced, and the power is also saved.

At step of S708: the image data of the pixel corresponding to the section of the light modulation device that is irradiated in the corresponding position state of the light deflecting device are modulated.

It can be understood that, in the first time period of one synchronization period of the synchronization signal, the control device can control the light deflecting device to be in a position state corresponding to 0 deflection (i.e., in the initial position state), the processing device can provide the data package P(0, 0) to the light modulation device. At this time, the light modulation device can modulate a plurality of received illumination sub-beams according to the data package P(0, 0). In the present embodiment, the light modulation device can modulate the illumination sub-beam according to height and color information of the pixels included in the data package P(0, 0).

In the second time period of one synchronization period of the synchronization signal, the control device can control the light deflecting device to deflect about the x-deflection axis, the processing device can provide the data package P(0, 1) to the light modulation device. At this time, the light modulation device can modulate a plurality of received illumination sub-beams according to the data package P(0, 1). In the present embodiment, the light modulation device can modulate the illumination sub-beam according to height and color information of the pixels included in the data package P(0, 1).

In the third time period of one synchronization period of the synchronization signal, the control device can control the light deflecting device to deflect about the z-deflection axis, the processing device can provide the data package P(1, 0) to the light modulation device. At this time, the light modulation device can modulate a plurality of received illumination sub-beams according to the data package P(1, 0). In the present embodiment, the light modulation device can modulate the illumination sub-beam according to height and color information of the pixels included in the data package P(1, 0).

In the fourth time period of one synchronization period of the synchronization signal, the control device can control the light deflecting device to deflect about the y-deflection axis, the processing device provides the data package P(1, 1) to the light modulation device. At this time, the light modulation device can modulate a plurality of received illumination sub-beams according to the data package P(1, 1). In the present embodiment, the light modulation device can modulate the illumination sub-beam according to height and color information of the pixels included in the data package P(1, 1).

In the present embodiment, from one modulation period to the next modulation period, the light deflecting device shifts the illumination sub-beam from one section to the next section of the micromirror unit. For example, in one modulation period, the light deflecting device can control the illumination sub-beam to irradiate the section A of the micromirror unit according to the synchronization signal, and the light modulation device can modulate the illumination sub-beam according to the data package P(0, 0) in the image data of one frame; when going into the next modulation period, the light deflecting device cyclically controls the illumination sub-beam to irradiate the section A of the micromirror unit according to the synchronization signal, and at this time, the light modulation device can modulate the illumination sub-beam according to the data package P(0, 0) in the image data of the next frame. In this way, image data of each frame in the video source can be modulated to generate a continuous projection effect.

Those skilled in the art can understand that the above embodiments are merely intended to explain, rather than to limit the present application. Without going beyond the spirit of the present disclosure, appropriate changes and modification of the above embodiments shall fall within the protection scope of the present disclosure.

What is claimed is:

1. A projection system, comprising:
a light modulation device configured to modulate incident light based on image data to form image light for displaying an image corresponding to the image data, wherein the light modulation device comprises a plurality of micromirror units, each of the plurality of micromirror units comprises an irradiation region comprising a plurality of sections, each of the plurality of sections corresponds to one pixel in the image, and incident light irradiating one section of the plurality of sections is modulated to form image light of a pixel corresponding to the one section;
a light source system configured to emit one or more illumination sub-beams, wherein the one or more illumination sub-beams irradiates one of the plurality of sections; and
a light deflecting device configured to shift the illumination sub-beam from one section of the plurality of sections to another section of the plurality of sections of one of the plurality of micromirror units in such a manner that each of the plurality of sections of each of the plurality of micromirror units modulates the one or more illumination sub-beams in a time division manner to form image light of a pixel corresponding to the section.

2. The projection system according to claim 1, wherein a coverage area of each of the one or more illumination sub-beams on the micromirror unit is not larger than an area of the one of the plurality of sections.

3. The projection system according to claim 1, wherein pixels corresponding to sections of each of the plurality of micromirror units are adjacent in the image.

4. The projection system according to claim 1, wherein the one or more illumination sub-beams emitted from the light source system are corresponding to the plurality of micromirror units of the light modulation device in one-to-one correspondence; and
wherein the light deflecting device is configured to cyclically deflect one of the one or more illumination sub-beams emitted by the light source system in the plurality of sections of the micromirror unit which is corresponding to the illumination sub-beam.

5. The projection system according to claim 4, wherein each of the plurality of sections of one of the plurality of micromirror units modulates image light of a pixel corresponding to the section in different modulation periods, and one section of the plurality of sections of each of the plurality of micromirror units of the light modulation device is configured to modulate image light in one same modulation period;
wherein from one modulation period to a next modulation period, the light deflecting device is configured to deflect one of the one or more illumination sub-beams from one section to a next section of the plurality of sections of one of the plurality of micromirror units; and
wherein the projection system further comprises a processing device, the processing device is configured to extract, from the image data, data of a pixel corresponding to a section of the light modulation device that modulates image light in a same modulation period, as image data corresponding to one modulation period, so as to obtain image data corresponding to each modulation period required for modulating the image by the light modulation device, and the processing device is further configured to provide the light modulation device with corresponding image data in each modulation period when the light modulation device is modulating the image, such that each of the plurality of micromirror units of the light modulation device modulates the image light in different modulation periods based on the corresponding image data, wherein image data obtained by the light modulation device in one modulation period comprises image data of a pixel corresponding to an irradiated section of the light modulation device in the one modulation period.

6. The projection system according to claim 5, wherein the processing device is further configured to decode a video source to generate the image data, and is further configured to unpack the image data based on a number of the plurality of sections of one of the plurality of micromirror units, to extract, from the image data, the data of the pixel corresponding to the section of the light modulation device that modulates the image light in the same modulation period.

7. The projection system according to claim 6, wherein a number of the image data that are obtained after decoding the video source by the processing device, corresponds to a number of the modulation periods.

8. The projection system according to claim 5, wherein the processing device is configured to generate a corresponding synchronization signal based on corresponding image data provided to the light modulation device in each modulation period;

wherein the projection system further comprises:
a control device configured to receive the synchronization signal, and control the light deflecting device to be in a corresponding position state based on the synchronization signal, such that one of the one or more illumination sub-beams is cyclically deflected in the plurality of sections of a corresponding one of the plurality of micromirror units.

9. The projection system according to claim 8, wherein, when the control device controls the light deflecting device to be in the corresponding position state based on the synchronization signal, the light modulation device is configured to modulate image data of a pixel corresponding to a section of the plurality of sections that is irradiated in the corresponding position state of the light deflecting device.

10. The projection system according to claim 1, wherein the light deflecting device has a plurality of position states corresponding to the plurality of sections of the micromirror unit in one-to-one correspondence, and the light deflecting device is configured to, when the light deflecting device is in one of the plurality of position states, direct one of the one or more illumination sub-beam to one section corresponding to the position state; and wherein the light deflecting device is configured to traverse each of the plurality of position states in such an order that a deflection magnitude from one position state to a next position state of the plurality of position states is as small as possible.

11. The projection system according to claim 1, wherein each of the plurality of micromirror units comprises four sections defined by two intersecting lines, and one of the one or more illumination sub-beams is shifted to each of the four sections of one of the micromirror units in a clockwise or counterclockwise direction.

12. The projection system according to claim 11, wherein the light deflecting device is a square flat plate, and the one or more illumination sub-beams transmit through the light deflecting device to irradiate the plurality of micromirror units;

wherein the light deflecting device has four position states corresponding to the four sections of the micromirror unit in one-to-one correspondence, and the light deflecting device is configured to deflect from an initial position state of the four position states along a first deflection axis, a second deflection axis, and a third deflection axis to a second position state, a third position state, and a fourth position state of the four position states, respectively, to shift the illumination sub-beam to the four sections of the micromirror unit; and wherein the light deflecting device comprises a first side, a second side, a third side, and a fourth side that are connected end-to-end to form the square flat plate; and the first deflection axis is parallel to the first side or the third side; the second deflection axis is parallel to the second side or the fourth side; the first side and the second side intersect at a first intersection side, the third side and the fourth side intersect at a second intersection side, and the third deflection axis is parallel to a line connecting the first intersection side to the second intersection side.

13. The projection system according to claim 1, wherein a modulation frequency of the light modulation device is a multiple of a refresh frequency of the image, and the multiple is equal to a number of the plurality of sections of each of the plurality of micromirror units.

14. The projection system according to claim 1, wherein the light source system further comprises:
an illumination source configured to emit an illumination beam; and
a microlens array configured to split the illumination beam emitted by the illumination source into the one or more illumination sub-beams corresponding to the plurality of micromirror units of the light modulation device in one-to-one correspondence.

15. The projection system according to claim 14, wherein the light source system further comprises:
a light homogenizing device disposed on an optical path between the illumination source and the microlens array, and configured to homogenize the illumination beam.

16. The projection system according to claim 15, wherein the light source system further comprises:
a color wheel disposed in the optical path between the illumination source and the microlens array,
wherein the color wheel is configured to convert the illumination beam emitted by the illumination source to obtain a monochromatic illumination beam or a color mixing illumination beam for modulating the image light, and is further configured to output the converted illumination beam to the microlens array.

\* \* \* \* \*